United States Patent
Sakita

[11] Patent Number: 5,285,865
[45] Date of Patent: Feb. 15, 1994

[54] AUTO DRIVE SYSTEM FOR A VEHICLE

[75] Inventor: Katsuya Sakita, Oobu, Japan

[73] Assignee: Nippondenso Co., Ltd., Kariya, Japan

[21] Appl. No.: 915,979

[22] Filed: Jul. 21, 1992

[30] Foreign Application Priority Data

Jul. 22, 1991 [JP] Japan .................................. 3-181276
Jun. 24, 1992 [JP] Japan .................................. 4-165971

[51] Int. Cl.⁵ ............................................. B60K 31/04
[52] U.S. Cl. ................................ 180/179; 364/426.04
[58] Field of Search ............... 180/170, 175, 176, 177, 180/178, 179; 123/350, 352; 364/426.04

[56] References Cited

U.S. PATENT DOCUMENTS 5,086,740 2/1992 Wiggins et al. ...................... 180/179
5,096,015 3/1992 Akishino et al. ..................... 180/179
5,125,471 6/1992 Iwaoka et al. ....................... 180/179

FOREIGN PATENT DOCUMENTS 60-64039 4/1985 Japan .
61-1545 1/1986 Japan .
62-203937 9/1987 Japan .

Primary Examiner—Richard M. Camby
Attorney, Agent, or Firm—Cushman, Darby & Cushman

[57] ABSTRACT

An auto drive system for a vehicle includes an accelerator member which can be operated by a vehicle driver. A detecting device associated with the accelerator member serves to detect a quantity of operation of the accelerator member. A stopping device engageable with the accelerator member serves to stop the accelerator member and to determine an unoperated position of the accelerator member. A driving device serves to move a position of the detecting device and a position of the stopping device by a movement amount along directions corresponding to a direction of increasing the quantity of operation of the accelerator member. A first controlling device serves to control a vehicle driving power on the basis of an output of the detecting device during unexecution of auto drive. A second control device serves to activate the driving device and to control the vehicle driving power on the basis of a target vehicle speed during execution of auto drive.

9 Claims, 12 Drawing Sheets

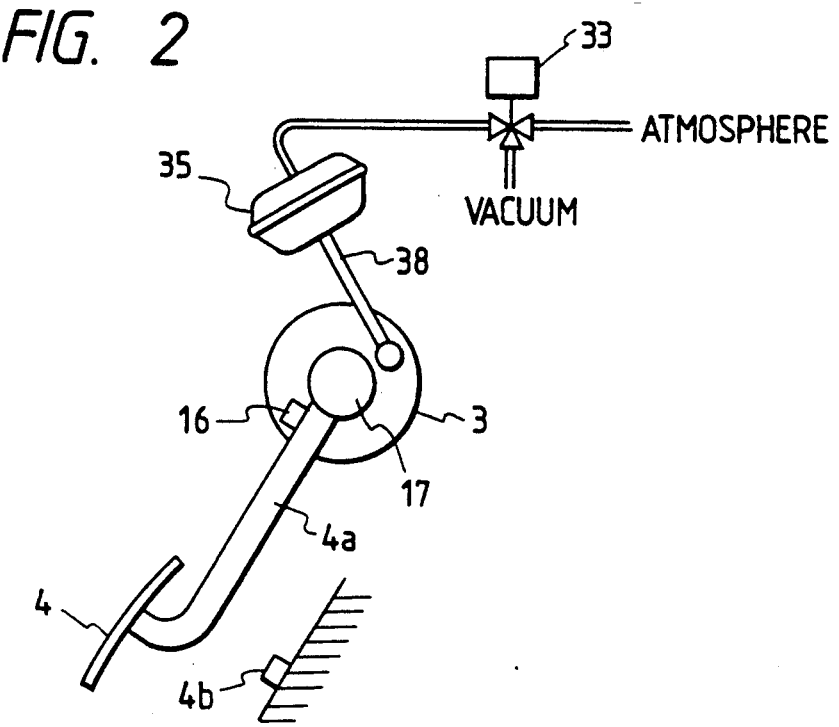
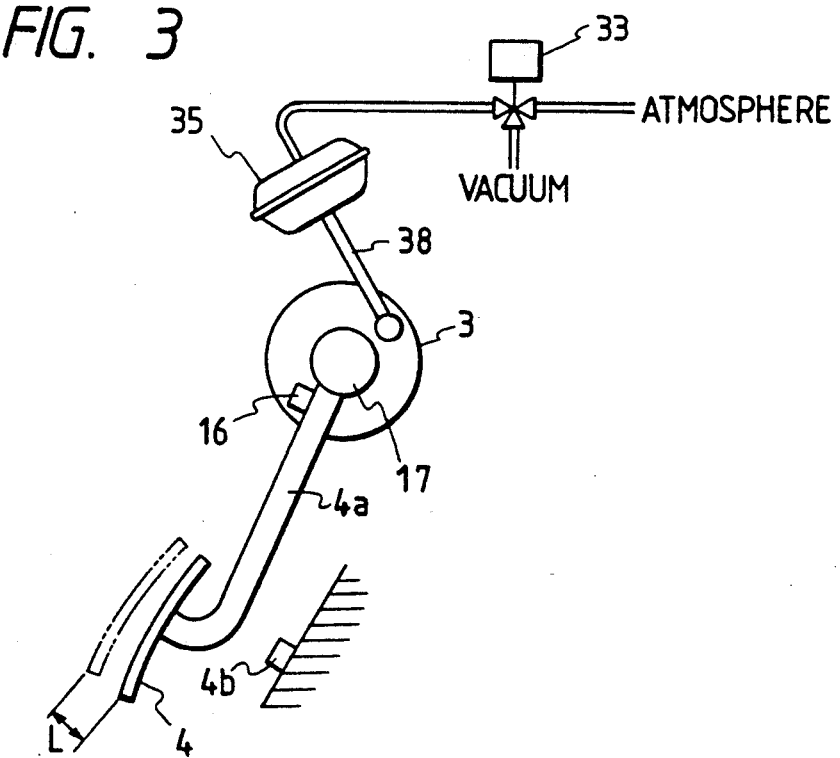

AUTO DRIVE SYSTEM FOR A VEHICLE

BACKGROUND OF THE INVENTION

1. Field of the Invention

This invention relates to an auto drive system for a vehicle or a cruise control system for a vehicle.

2. Description of the Prior Art

Japanese published unexamined patent application 61-1545 discloses an auto drive (cruise control) system for a vehicle. The auto drive system of Japanese application 61-1545 includes a potentiometer for detecting the degree of depression of an accelerator pedal, and first and second control devices. The first control device adjusts the degree of opening of a throttle valve on the basis of an output signal from the potentiometer, enabling the vehicle to be driven in response to the depression of the accelerator pedal. When auto drive is required, the second control device adjusts the degree of opening of the throttle valve so as to regulate the speed of the vehicle at a desired speed.

The auto drive system of Japanese application 61-1545 has a problem as follows. After setting of the desired auto drive speed is completed and then the accelerator pedal is released, the accelerator pedal is returned to its undepressed position by a return spring while the throttle valve is held at a desired open position. This positioning of the throttle valve independent from the accelerator pedal is enabled by the absence of a mechanical connection between the accelerator pedal and the throttle valve. Thus, when the vehicle driver requires an interruption of auto drive and a temporary increase in the vehicle speed from the desired auto drive speed, it is necessary for the vehicle driver to depress the accelerator pedal from its undepressed position. During the depression of the accelerator pedal, the vehicle speed is held at the desired auto drive speed by the auto drive system until the accelerator pedal reaches a position corresponding to the desired auto drive speed. Accordingly, during a former stage of the depression of the accelerator pedal, the vehicle speed is insensitive to the movement of the accelerator pedal. This insensitiveness tends to cause the vehicle driver to excessively depress the accelerator pedal.

SUMMARY OF THE INVENTION

It is an object of this invention to provide an improved auto drive system for a vehicle.

A first aspect of this invention provides an auto drive system for a vehicle which comprises an accelerator member which can be operated by a vehicle driver; detecting means associated with the accelerator member for detecting a quantity of operation of the accelerator member; stopping means engageable with the accelerator member for stopping the accelerator member and determining an unoperated position of the accelerator member; driving means for moving a position of the detecting means and a position of the stopping means by a movement amount along directions corresponding to a direction of increasing the quantity of operation of the accelerator member; first controlling means for controlling a vehicle driving power on the basis of an output of the detecting means during unexecution of auto drive; and second controlling means for activating the driving means and controlling the vehicle driving power on the basis of a target vehicle speed during execution of auto drive.

A second aspect of this invention provides an auto drive system for a vehicle which comprises an accelerator pedal movable into and from an undepressed position; first means for determining whether auto drive is executed or unexecuted; and second means for changing the undepressed position of the accelerator pedal in response to a result of said determining by the first means.

A third aspect of this invention provides an auto drive system for a vehicle which comprises a throttle valve for adjusting a vehicle driving power; an accelerator pedal being mechanically separate from the throttle valve and being movable between an undepressed position and a fully-depressed position; detecting means for detecting a displacement of the accelerator pedal from its undepressed position, and outputting an accelerator pedal position signal representative thereof; determining means for determining whether auto drive is executed or unexecuted; first controlling means for controlling the throttle valve in response to the accelerator pedal position signal when the determining means determines auto drive to be unexecuted; second controlling means for controlling the throttle valve in accordance with a desired position of the throttle valve when the determining means determines auto drive to be executed; and changing means for changing the undepressed position of the accelerator pedal in response to a result of said determining by the determining means.

A fourth aspect of this invention provides an auto drive system for a vehicle which comprises a first throttle valve for adjusting a vehicle driving power; a second throttle valve for adjusting the vehicle driving power; an accelerator pedal movable between an undepressed position and a fully-depressed position; connecting means for mechanically connecting the accelerator pedal and the second throttle valve so that the second throttle valve will be controlled by the accelerator pedal; determining means for determining whether auto drive is executed or unexecuted; first controlling means for controlling the first throttle valve in accordance with a desired position of the first throttle valve when the determining means determines auto drive to be executed; and changing means for changing the undepressed position of the accelerator pedal in response to a result of said determining by the determining means.

BRIEF DESCRIPTION OF THE DRAWINGS

FIGS. 2 and 3 are diagrams of the accelerator pedal, the potentiometer, and related members in the auto drive system of FIG. 1.

DESCRIPTION OF THE FIRST PREFERRED EMBODIMENT

Figure 1:
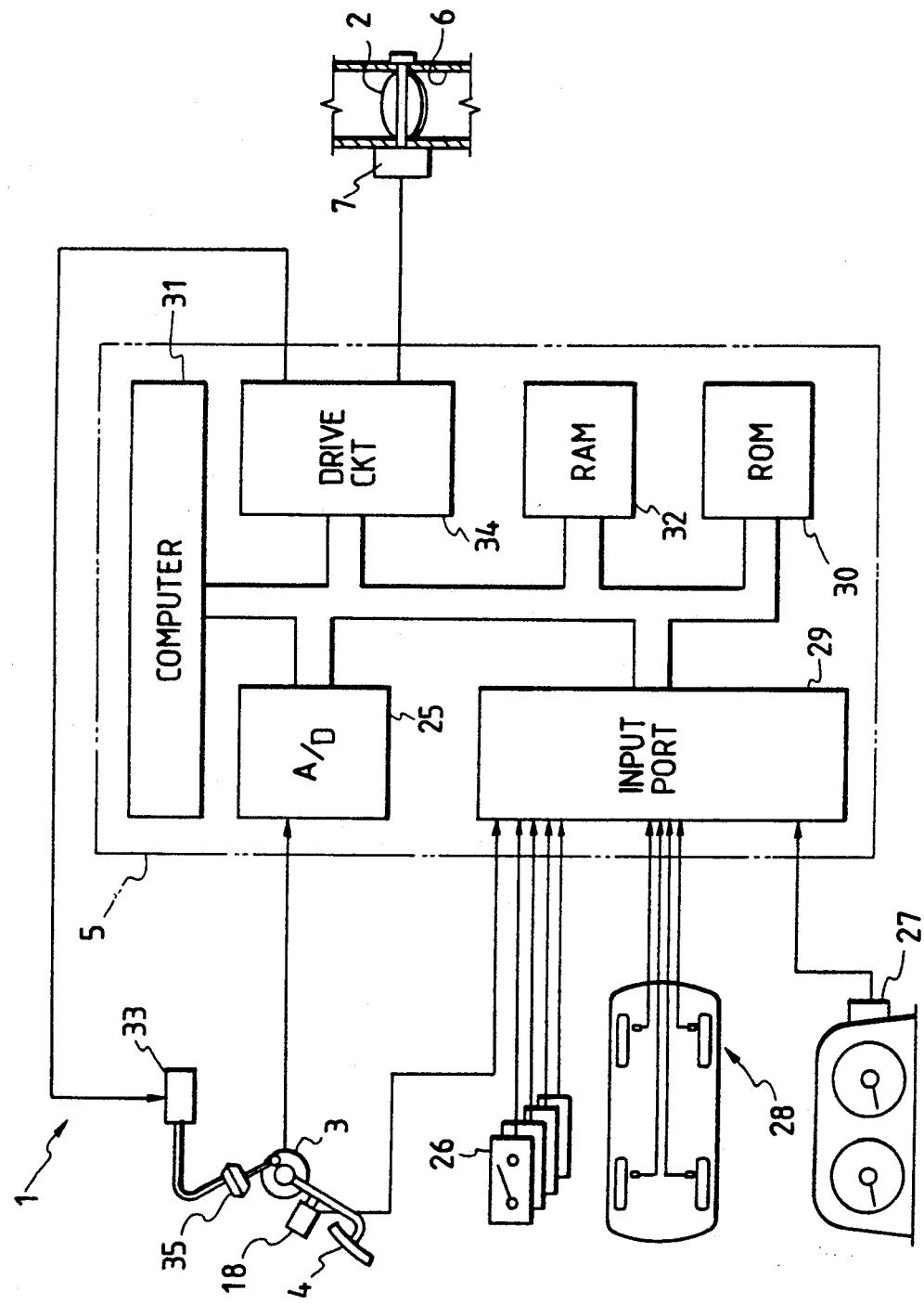
FIG. 1 is a diagram of an auto drive system for a vehicle according to a first embodiment of this invention.

With reference to FIG. 1, an auto drive system 1 for a vehicle includes a throttle valve 2, a potentiometer (a position sensor) 3, an accelerator pedal 4, and a throttle valve control circuit 5. It should be noted that the accelerator pedal 4 may be replaced by an accelerator lever or another manually-operated member for varying the power output of a vehicle-powering engine. In addition, the potentiometer 3 may be replaced by a displacement sensor or an angular position sensor.

As will be made clear later, when the accelerator pedal 4 is released, the accelerator pedal 4 is returned by a suitable urging device to its undepressed position. The undepressed position of the accelerator pedal 4 can be changed between first and second positions referred to as a normal undepressed position and an auto-drive undepressed position respectively. When auto drive is executed, the undepressed position of the accelerator pedal 4 is changed to the auto-drive undepressed position. When auto drive is suspended, the undepressed position of the accelerator pedal 4 is changed to the normal undepressed position. The auto-drive undepressed position is spaced from the normal undepressed position in a direction toward a fully-depressed position of the accelerator pedal 4.

The throttle valve 2 is rotatably disposed in an engine air intake passage 6. The rate of air flow, that is, the rate of air-fuel mixture flow, into a vehicle-powering engine depends on the degree of opening of the throttle valve 2. The throttle valve 2 can be driven by a stepping motor 7. The stepping motor 7 is controlled by a control signal fed from the throttle valve control circuit 5. The degree of opening of the throttle valve 2 is varied by the stepping motor 7 in response to the control signal.

As shown in FIGS. 1, 2, and 3, the potentiometer 3 is associated with the accelerator pedal 4 to detect the degree of depression of the accelerator pedal 4. The accelerator pedal 4 is mounted on a shaft 17 via an arm 4a. The shaft 17 rotates in accordance with the depression of the accelerator pedal 4. The potentiometer 3 is associated with the shaft 17, sensing the angular position of the shaft 17 as an indication of the degree of depression of the accelerator pedal 4. The potentiometer 3 outputs an analog signal representing the degree of depression of the accelerator pedal 4.

Specifically, the potentiometer 3 has a control arm and a body. The control arm can rotate relative to the body. The output signal from the potentiometer 3 depends on the angular position of the control arm relative to the body. The control arm of the potentiometer 3 is connected to the shaft 17. The body of the potentiometer 3 is fixed to a lever 12 which will be described later.

Figure 4:
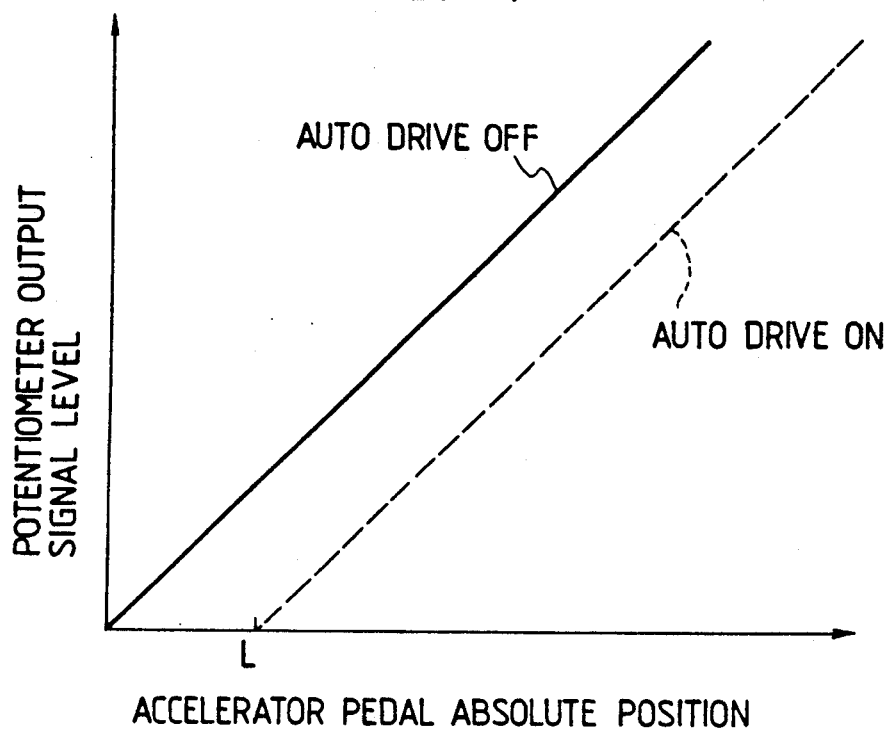
FIG. 4 is a diagram showing the relation between the absolute position of the accelerator pedal and the level of the output signal from the potentiometer in the auto drive system of FIG. 1.

As shown in FIG. 4, the voltage of the accelerator depression degree signal outputted from the potentiometer 3 varies linearly with the absolute position of the accelerator pedal 4.

Figure 5:
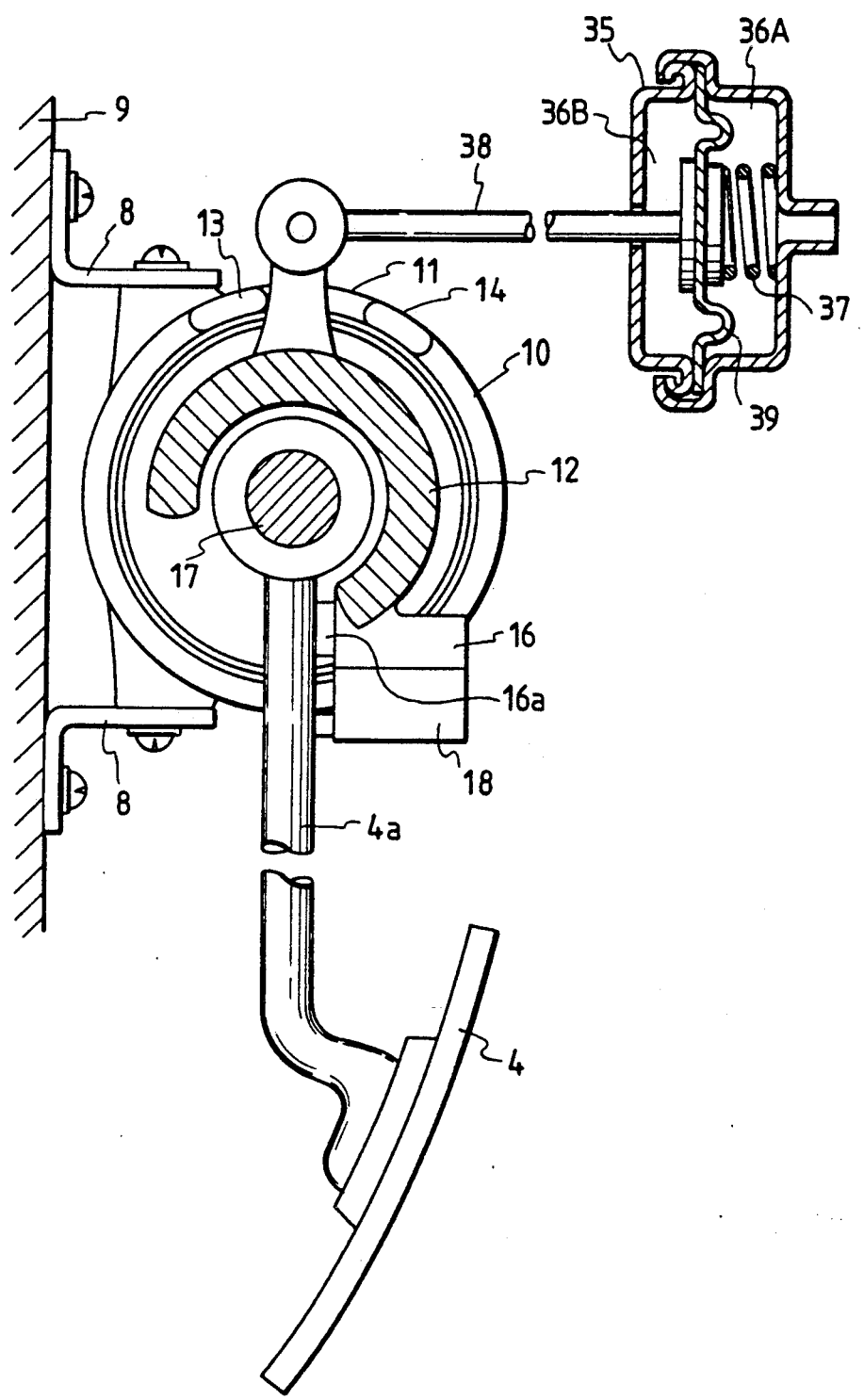
FIG. 5 is a sectional view of the accelerator pedal and related members in the auto drive system of FIG. 1 which is taken along the line A—A of FIG. 6.
Figure 6:
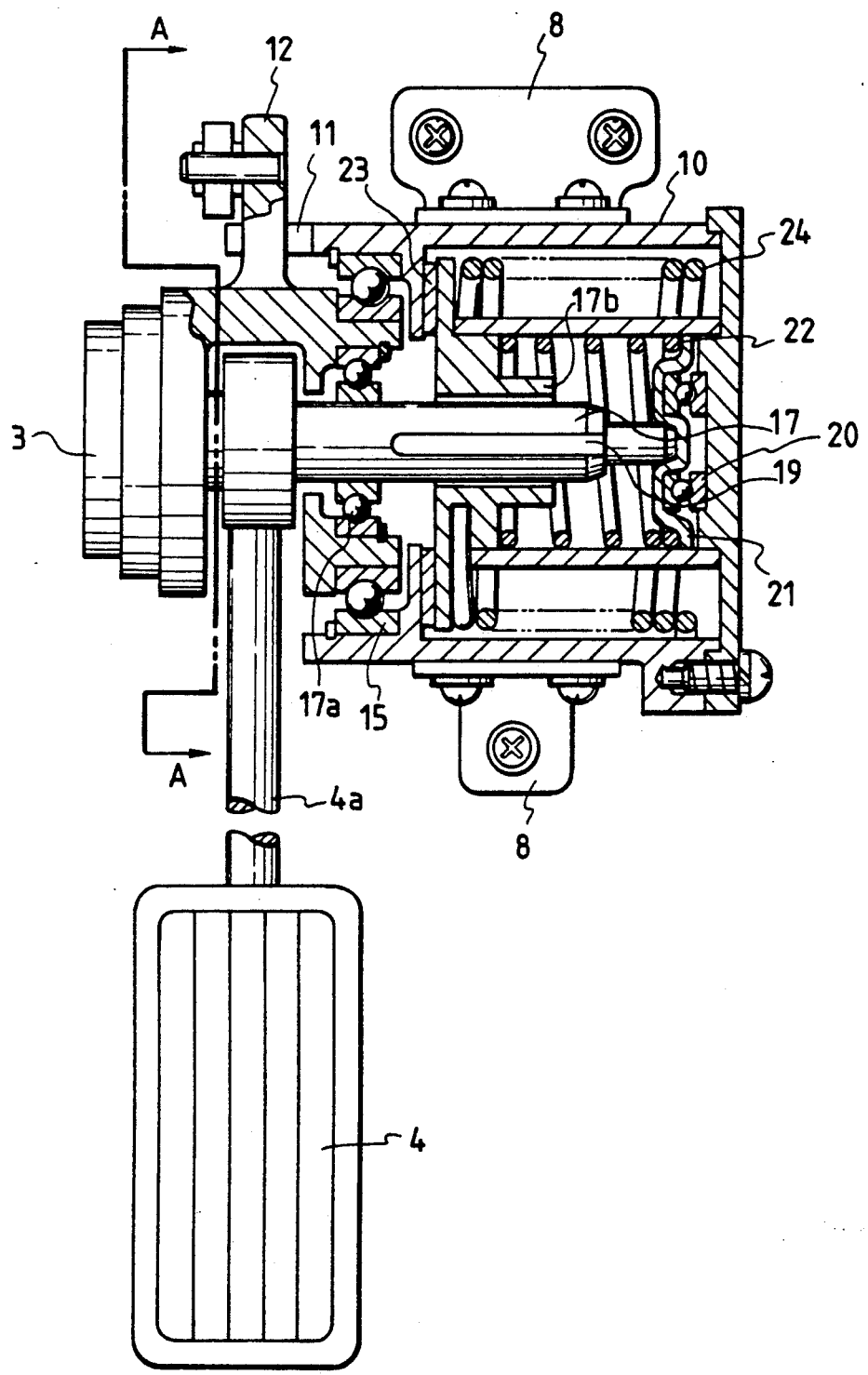
FIG. 6 is a sectional view of the accelerator pedal, the potentiometer, and related members in the auto drive system of FIG. 1.

As shown in FIGS. 5 and 6, a cylindrical housing 10 is attached to a vehicle floor panel 9 by brackets 8. The housing 10 has a groove 11 through which a rotatable lever 12 extends. The lever 12 has a semicylindrical portion to which the body of the potentiometer 3 is attached. As shown in FIG. 5, the part of the housing 10 which defines the groove 11 is provided with first and second stoppers 13 and 14. The lever 12 extends between the first and second stoppers 13 and 14. The lever 12 can engage the first and second stoppers 13 and 14. In FIG. 5, the first stopper 13 limits counterclockwise movement of the lever 12, and the second stopper 14 limits clockwise movement of the lever 12.

As shown in FIG. 6, the lever 12 is rotatably supported on the inner surface of the housing 10 by a bearing 15. In FIG. 5, a lower end of the lever 12 has a stopper 16 which serves to stop the accelerator pedal 4 at its undepressed position when the accelerator pedal 4 is released. The stopper 16 enables the prevention of excessive return of the accelerator pedal 4 when the accelerator pedal 4 is released.

As shown in FIG. 5, the stopper 16 includes a rubber member 16a attached to a main portion of the stopper 16. In FIG. 5, when the accelerator pedal 4 is released, the accelerator pedal 4 and the arm 4a move counterclockwise until the arm 4a encounters the rubber member 16a of the stopper 16. The rubber member 16a prevents the occurrence of big noise upon the collision between the arm 4a and the stopper 16. In FIG. 5, a switch or a position sensor 18 is connected to a lower surface of the stopper 16. The switch 18 detects whether or not the accelerator pedal 4 is in its undepressed position (released position), and generates a digital signal representative thereof.

One end of the arm 4a is connected to the accelerator pedal 4. The other end of the arm 4a is connected to the shaft 17. The shaft 17 is concentrically disposed in the housing 10. As described previously, the lever 12 has a semicylindrical portion. The shaft 17 is rotatably supported on the inner surface of the semicylindrical portion of the lever 12 by a bearing 17a. As the accelerator pedal 4 is depressed, the arm 4a rotates about the shaft 17 together with the accelerator pedal 4. The shaft 17 rotates together with the arm 4a. As shown in FIGS. 2 and 3, a stopper 4b attached to a portion of a vehicle body can engage the arm 4a. In FIGS. 2 and 3, as the accelerator pedal 4 is depressed, the arm 4a rotates counterclockwise until the arm 4a encounters the stopper 4b. The stopper 4b determines a fully-depressed position of the accelerator pedal 4.

The shaft 17 supports the arm 4a and the accelerator pedal 4. As shown in FIG. 6, a cylindrical slider 17b extending in the housing 10 is slidably mounted on the shaft 17. The outer surface of the shaft 17 has axially-extending key grooves 19. The inner surface of the slider 17b has key projections fitting into the key grooves 19 in the shaft 17. In this way, the slider 17b is connected to the shaft 17 by a key coupling. The slider 17b can slide axially relative to the shaft 17. In FIG. 6, a retainer 21 disposed in the housing 10 receives the right-hand end of the shaft 17. The retainer 21 is rotatably supported on the end wall of the housing 10 by a bearing 20.

A return spring 24 extending in the housing 10 is provided between the end wall of the housing 10 and the slider 17b. The return spring 24 circumferentially urges the slider 17b relative to the housing 10, thereby angularly urging the shaft 17, the arm 4a, and the accelerator pedal 4. Specifically, the return spring 24 urges the accelerator pedal 4 toward its undepressed position when the accelerator pedal 4 is moved from its undepressed position.

A compression spring 22 extending in the housing 10 is provided between the slider 17b and the retainer 21. The housing 10 has an inwardly-projecting annular step portion to which a ring-shaped friction member 23 is attached. The spring 22 presses the slider 17b against the friction member 23, thereby offering suitable friction to movement of the accelerator pedal 4.

As shown in FIG. 1, the throttle valve control circuit 5 includes an A/D converter 25 and an input port 29. The A/D converter 25 receives the analog accelerator depression degree signal from the potentiometer 3, converting the analog accelerator depression degree signal into a corresponding digital signal. A combination switch unit 26 includes an auto drive main switch, an auto drive set switch, an auto drive cancel switch, and a deceleration switch for generating various digital instruction signals. The input port 29 receives the output digital signal from the accelerator undepressed-position switch 18, and also receives the digital instruction signals from the combination switch unit 26. In addition, the input port 29 receives an output digital signal from a vehicle body speed sensor 27 which represents the speed of the vehicle body. Furthermore, the input port 29 receives output digital signals from vehicle wheel speed sensors 28 which represent the rotational speeds of vehicle wheels.

The throttle valve control circuit 5 also includes a read only memory (ROM) 30, a computer main section 31 such as a CPU, a random access memory (RAM) 32, and a drive circuit (an output port) 34. The A/D converter 25, the input port 29, the ROM 30, the computer main section 31, the RAM 32, and the drive circuit 34 are connected via a bus. The computer main section 31 operates to execute a program stored in the ROM 30. The RAM 32 is used in temporarily storing data during the operation of the throttle valve control circuit 5. The drive circuit 34 outputs control drive signals to the stepping motor 7 and an electrically-driven (solenoid) change valve 33 to drive and control the latters. The change valve 33 will be described later.

Figure 7:
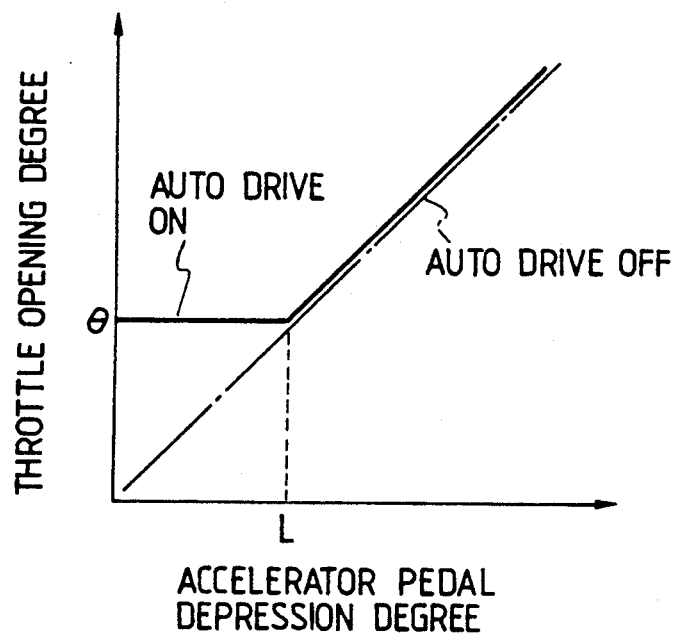
FIG. 7 is a diagram showing the relation between the degree of depression of the accelerator pedal and the degree of opening of the throttle valve in the auto drive system of FIG. 1.

In general, the computer main section 31 operates to vary the degree of opening of the throttle valve 2 in accordance with the degree of depression of the accelerator pedal 4. Specifically, as shown in FIG. 7, in the case where auto drive is on, the degree of opening of the throttle valve 2 is kept constant when the degree of depression of the accelerator pedal 4 exists in a range equal to or below a given degree "L". Furthermore, in the case where auto drive is on, the degree of opening of the throttle valve 2 is varied linearly with the degree of depression of the accelerator pedal 4 when the degree of depression of the accelerator pedal 4 is greater than the given degree "L". In the case where auto drive is off, the degree of opening of the throttle valve 2 is made proportional to the degree of depression of the accelerator pedal 4.

As shown in FIGS. 2 and 3, the change valve 33 is of the three-way type, having a first input port opening into atmosphere and a second input port connected to a vacuum source. An output port of the change valve 33 is connected to a pressure-responsive actuator 35. The change valve 33 selects and feeds one of the atmospheric pressure and a vacuum to the actuator 35 in accordance with the control drive signal outputted from the drive circuit 34. Specifically, when the control drive signal outputted from the drive circuit 34 assumes an on state, the change valve 33 selects the vacuum and feeds the vacuum to the actuator 35. When the control drive signal outputted from the drive circuit 34 assumes an off state, the change valve 33 selects the atmospheric pressure and feeds the atmospheric pressure to the actuator 35.

As shown in FIG. 5, the actuator 35 includes a casing, the interior of which is divided into first and second chambers 36A and 36B by a diaphragm 39. A compression spring 37 disposed in the first chamber 36A urges the diaphragm 39 toward the second chamber 36B. The first chamber 36A communicates with the output port of the change valve 33 (see FIGS. 2 and 3). The second chamber 36B opens into atmosphere. One end of a rod 38 is connected to the diaphragm 39. The other end of the rod 38 is connected to an end of the lever 12 which projects outward from the housing 10.

In the case where the first chamber 36A is subjected to the atmospheric pressure by the change valve 33, the compression spring 37 moves the diaphragm 39 toward the second chamber 36B so that the rod 38 rotates the lever 12 until the lever 12 encounters the stopper 13. In the case where the first chamber 36A is subjected to the vacuum by the change valve 33, the vacuum moves the diaphragm 39 toward the first chamber 36A against the force of the compression spring 37 so that the rod 38 rotates the lever 12 until the lever 12 encounters the stopper 14. Since the body of the potentiometer 3 is attached to the lever 12, the body of the potentiometer 3 rotates together with the lever 12. During the change of the pressure in the first chamber 36A between the atmospheric pressure and the vacuum, the body of the potentiometer 3 is rotated about the shaft 17 by an angular range "L".

In this way, the actuator 35 functions to rotate the body of the potentiometer 3 by an angular range "L" corresponding to an angular spacing "$\theta$" between the stoppers 13 and 14. Since the stopper 16 moves together with the lever 12 and the body of the potentiometer 3, the angular position of the stopper 16 and thus the undepressed position of the accelerator pedal 4 move angularly in accordance with the rotation of the body of the potentiometer 3 (see FIGS. 2 and 3). The undepressed position of the accelerator pedal 4 is changed between the normal undepressed position and the auto drive undepressed position in accordance with the movement of the lever 12 by the actuator 35. The output signal of the potentiometer 3 represents a displacement of the accelerator pedal 4 from its undepressed position regardless of whether the undepressed position of the accelerator pedal 4 is changed between the normal undepressed position and the auto drive undepressed position.

Figure 8:
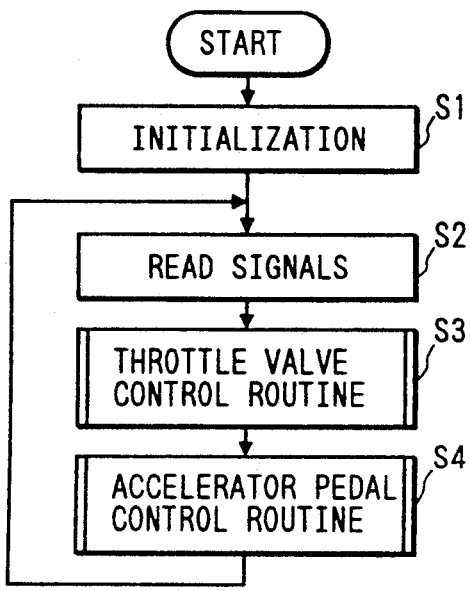
FIG. 8 is a flowchart of a program operating the throttle valve control circuit in the auto drive system of FIG. 1.

The throttle valve control circuit 5 operates in accordance with a program stored in the ROM 30. FIG. 8 is a flowchart of the program. As shown in FIG. 8, a first block S1 of the program initializes variables and data defined and stored in the RAM 32. After the block S1, the program advances to a block S2 which samples and inputs the current digital values and states of the accelerator depression degree signal, the instruction signals, the vehicle body speed signal, the vehicle wheel speed signals outputted from the potentiometer 3, the combination switch unit 26, the vehicle body speed sensor 27, and the vehicle wheel speed sensors 28. The sampled and inputted current values and states of the signals are stored into the RAM 32. For example, the sampled and inputted current values and states of the instruction signals outputted from the combination switch unit 26 will be used by later steps in determining whether or not auto drive is currently executed. The block S2 is successively followed by a throttle valve control routine S3 and an accelerator pedal control routine S4. After the accelerator pedal control routine S4, the program returns to the block S2. As a result, the block S2 and the routines S3 and S4 are periodically reiterated.

Figure 9:
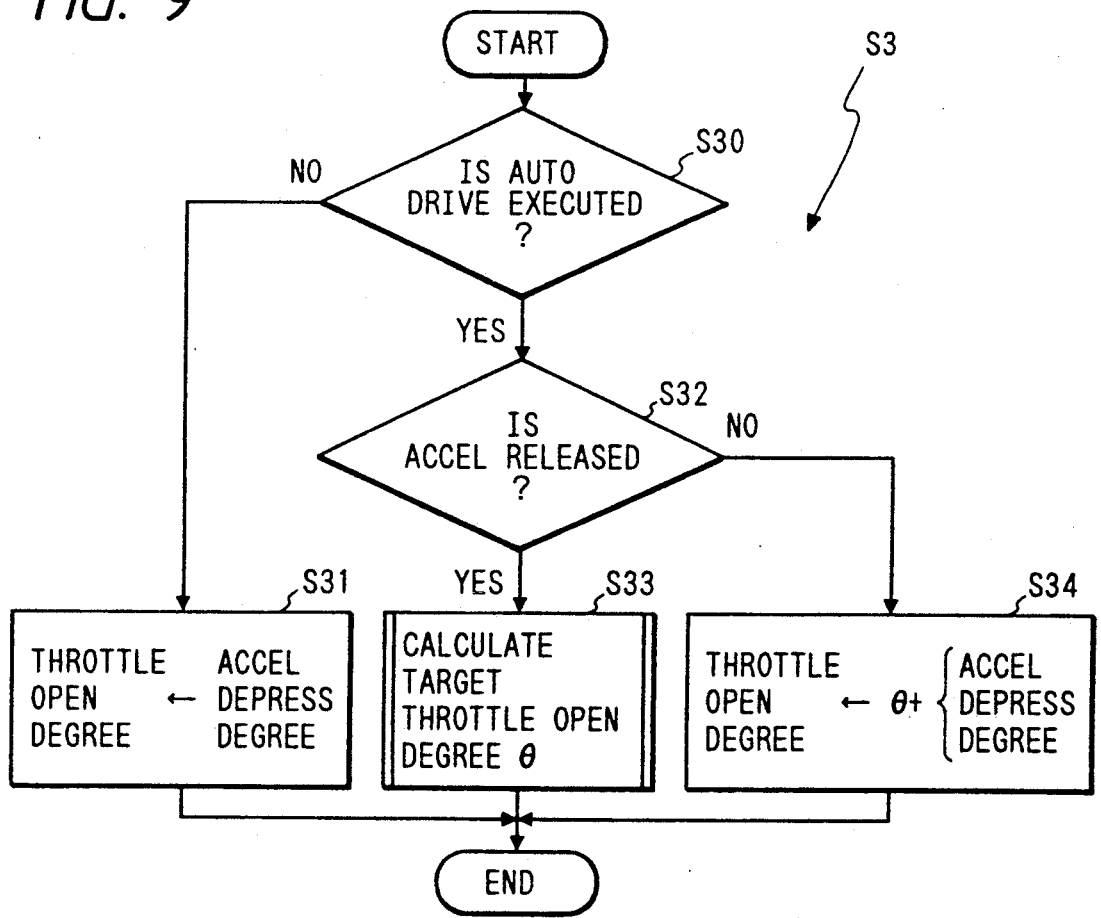
FIG. 9 is a flowchart of the throttle valve control routine of FIG. 8.

FIG. 9 shows the details of the throttle valve control routine S3. As shown in FIG. 9, a first step S30 of the throttle valve control routine S3 determines whether or not auto drive is currently executed. When auto drive is determined to be not currently executed, the program advances from the step S30 to a step S31. When auto drive is determined to be currently executed, the program advances from the step S30 to a step S32. The step S31 sets a target degree of opening of the throttle valve 2 in accordance with the current degree of depression of the accelerator pedal 4. After the step S31, the program moves out of the throttle valve control routine S3. The step S32 determines whether or not the accelerator pedal 4 is in its undepressed position, that is, whether or not the accelerator pedal 4 is released. When the accelerator pedal 4 is determined to be in its undepressed position, the program advances from the step S32 to a step S33. When the accelerator pedal 4 is determined to be out of its undepressed position, the program advances from the step S32 to a step S34. The step S33 calculates a target degree of opening of the throttle valve 2 in a known way according to conventional auto drive control. After the step S33, the program moves out of the throttle valve control routine S3. The step S34 calculates a target degree of opening of the throttle valve 2 from the previous target degree of opening of the throttle valve 2 (which was calculated by the step S33) and the current degree of depression of the accelerator pedal 4. Specifically, the target degree of opening of the throttle valve 2 which is calculated by the step S34 is equal to the sum of the previous target degree of opening of the throttle valve 2 and the current degree of depression of the accelerator pedal 4. After the step S34, the program moves out of the throttle valve control routine S3.

It should be noted that a step or steps in a periodically-executed output routine (not shown) control the stepping motor 7 in response to the target degree of opening of the throttle valve 2 which is set and calculated by the steps S31, S33, and S34. The control of the stepping motor 7 is designed so that the actual degree of opening of the throttle valve 2 will be equal to the target degree of opening of the throttle valve 2.

Figure 10:
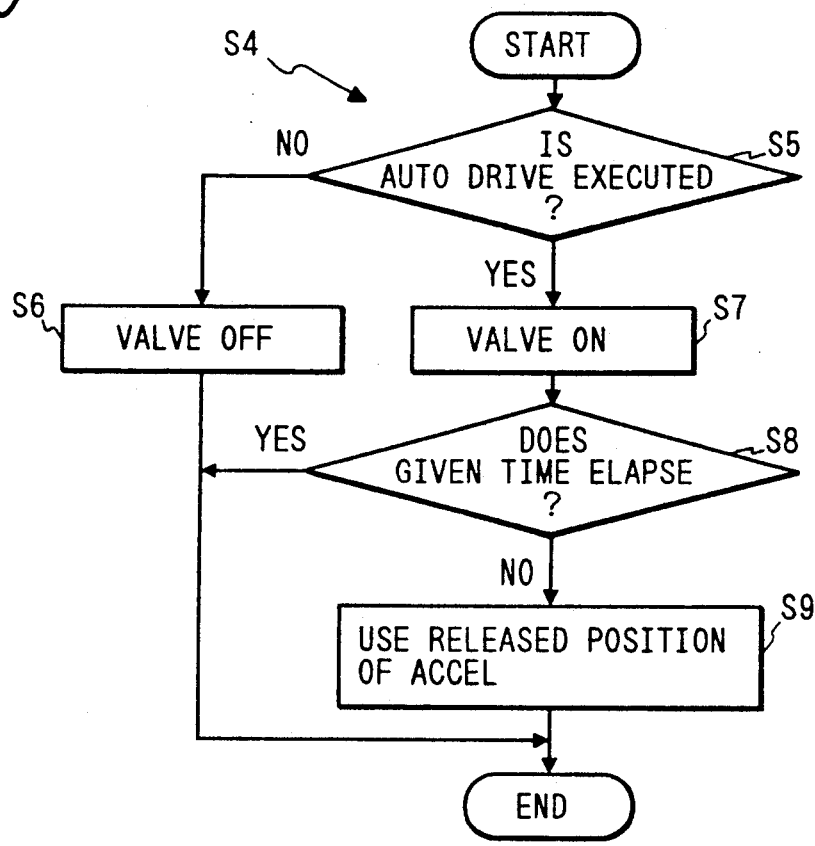
FIG. 10 is a flowchart of the accelerator pedal control routine of FIG. 8.

FIG. 10 shows the details of the accelerator pedal control routine S4. As shown in FIG. 10, a first step S5 of the accelerator pedal control routine S4 determines whether or not auto drive is currently executed. When auto drive is determined to be not currently executed, the program advances from the step S5 to a step S6. When auto drive is determined to be currently executed, the program advances from the step S5 to a step S7. The step S6 outputs an off-state control drive signal to the change valve 33. After the step S6, the program moves out of the accelerator pedal control routine S4. The step S7 outputs an on-state control drive signal to the change valve 33. After the step S7, the program advances to a step S8. The step S8 determines whether or not a given time (for example, one second) elapses from the moment of the start of auto drive. When the given time elapses from the moment of the start of auto drive, the program advances from the step S8 and moves out of the accelerator pedal control routine S4. When the given time does not elapse from the moment of the start of auto drive, the program advances to a step S9. By the step S9, the variable representing the current degree of depression of the accelerator pedal 4 is set to a value corresponding to the undepressed position of the accelerator pedal 4. After the step S9, the program moves out of the accelerator pedal control routine S4. The step S9 serves to compensate for a response delay of operation of the actuator 35. The given time used by the step S8 is chosen so as to prevent inaccurate and wrong detection of the degree of depression of accelerator pedal 4 which might be caused by a response delay of operation of the actuator 35.

Figure 11:
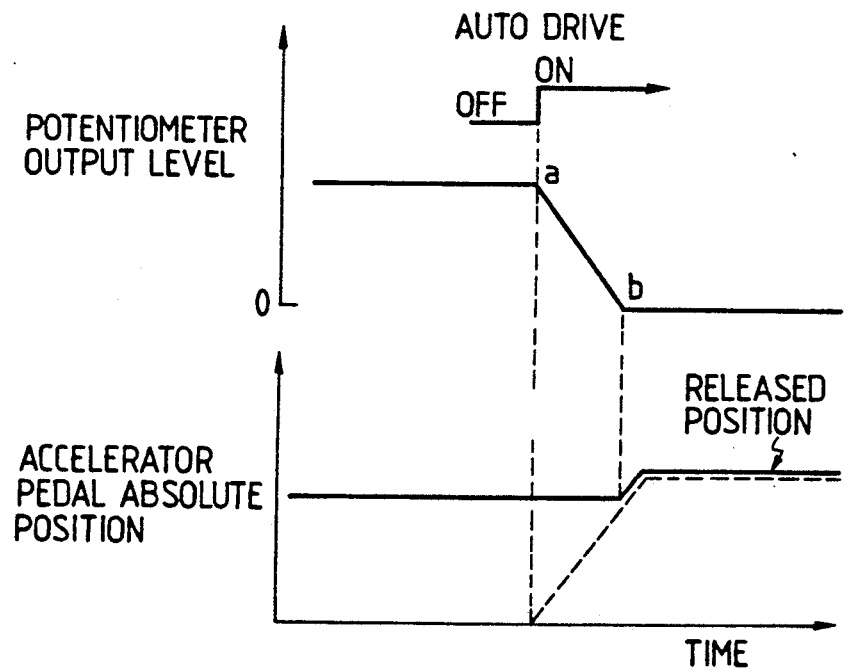
FIG. 11 is a time domain diagram showing variations in the level of the output signal from the potentiometer and the absolute position of the accelerator pedal in the auto drive system of FIG. 1.

It is now assumed that, as shown in FIG. 11, at a moment "a", auto drive is activated and is changed to an on state from an off state. After the moment "a", the accelerator pedal 4 is kept stationary. The change of auto drive to the on state feeds an on-state control drive signal to the change valve 33, thereby applying the vacuum to the first chamber 36A of the actuator 35. As the vacuum is applied to the first chamber 36A of the actuator 35, the lever 12 is rotated clockwise by the actuator 35 in FIG. 5. The undepressed position of the accelerator pedal 4 is moved angularly in accordance with the rotation of the lever 12. In FIG. 11, at a moment "b", the rubber member 16a of the stopper 16 encounters the arm 4a so that the accelerator pedal 4 is held. At the moment "b", the output signal from the potentiometer 3 represents the undepressed position of the accelerator pedal 4. At the moment "a", the output signal from the potentiometer 3 does not correspond to the undepressed position of the accelerator pedal 4. Thus, there is a chance that a temporary acceleration during auto drive is erroneously determined to be present. To prevent such wrong determination, the step S8 and S9 continue to set the current degree of depression of the accelerator pedal 4 to a value corresponding to the undepressed position of the accelerator pedal 4 until the given time elapses from the moment of the start of auto drive.

Auto drive will be described in more detail. To start auto drive, the auto drive main switch in the combination switch unit 26 is turned on and the accelerator pedal 4 is adjusted. When the vehicle body speed reaches a desired speed as a result of the adjustment of the accelerator pedal 4 and the auto drive set switch in the combination switch unit 26 is actuated, auto drive is actually started.

Upon the start of auto drive, the drive circuit 34 outputs an on-state control drive signal to the change valve 33 so that the vacuum is applied to the first chamber 36A of the actuator 35. In FIG. 5, the vacuum in the first chamber 36A of the actuator 35 moves the rod 38 rightward, and thus the lever 12 is rotated clockwise. Then, the lever 12 stops when encountering the stopper 14. The body of the potentiometer 3 and the stopper 16 rotate clockwise in accordance with the rotation of the lever 12. Provided that the arm 4a contacts the rubber member 16a of the stopper 16, the accelerator pedal 4 and the shaft 17 rotate clockwise in accordance with the rotation of the lever 12.

In FIG. 5, the lever 12 is rotated clockwise in this way by the angle "$\theta$" corresponding to the angular spacing between the stoppers 13 and 14. As the lever 12 rotates clockwise by the angle "$\theta$", the undepressed position of the accelerator pedal 4 is angularly moved by the quantity "L" (see FIG. 3) toward its fully-depressed position.

Since the control arm of the potentiometer 3 is connected to the shaft 17, the control arm of the potentiometer 3 rotates clockwise in accordance with the rotation of the shaft 17 and the accelerator pedal 4. Since the body of the potentiometer 3 is fixed to the lever 12, the body of the potentiometer 3 rotates clockwise in accordance with the rotation of the lever 12. Provided that the arm 4a contacts the rubber member 16a of the stopper 16, the control arm of the potentiometer 3 and the body of the potentiometer 3 move together with the lever 12 since the shaft 17 rotates clockwise in accordance with the rotation of the lever 12. Thus, during the angular movement of the accelerator pedal 4 by the quantity "L" (see FIG. 3), the angular position of the control arm of the potentiometer 3 remains unchanged relative to the body of the potentiometer 3 so that the output signal from the potentiometer 3 continues to assume a given voltage corresponding to the undepressed position of the accelerator pedal 4 as shown in FIG. 4. In addition, during the angular movement of the accelerator pedal 4 by the quantity "L" (see FIG. 3), the actual degree of opening of the throttle valve 2 is kept at the target degree "$\theta$" given by the step S33 of FIG. 9.

During the execution of auto drive, when the accelerator pedal 4 is depressed to temporarily accelerate the vehicle body, the output signal from the potentiometer 3 varies linearly with the degree of depression of the accelerator pedal 4 as shown in FIG. 4. In addition, the actual degree of opening of the throttle valve 2 increases linearly with the degree of depression of the accelerator pedal 4 as shown in FIG. 7. This increase in the actual degree of opening of the throttle valve 2 is enabled by the step S34 of FIG. 9. During the execution of auto drive, since the undepressed position of the accelerator pedal 4 is offset toward the fully-depressed position, it is possible to reliably and easily perform the operation of accelerator pedal 4 to temporarily accelerate the vehicle body. In addition, it is possible to prevent excessive depression of the accelerator pedal 4.

When the auto drive main switch in the combination switch unit 26 is turned off to suspend auto drive, or when a vehicle brake (not shown) or a vehicle clutch (not shown) is actuated, the drive circuit 34 outputs an off-state control drive signal to the change valve 33 so that the atmospheric pressure is applied to the first chamber 36A of the actuator 35. In FIG. 5, the atmospheric pressure in the first chamber 36A of the actuator 35 permits the rod 38 to return leftward, and thus the lever 12 rotates counterclockwise. Then, the lever 12 stops upon encountering the stopper 13. The body of the potentiometer 3 and the stopper 16 rotate counterclockwise in accordance with the rotation of the lever 12. Provided that the arm 4a contacts the rubber member 16a of the stopper 16, the accelerator pedal 4 and the shaft 17 rotate counterclockwise in accordance with the rotation of the lever 12.

In FIG. 5, the lever 12 rotates counterclockwise in this way by the angle "$\theta$" corresponding to the angular spacing between the stoppers 13 and 14. As the lever 12 rotates counterclockwise by the angle "$\theta$", the undepressed position of the accelerator pedal 4 is angularly moved by the quantity "L" (see FIG. 3) away from its fully-depressed position.

Since the control arm of the potentiometer 3 is connected to the shaft 17, the control arm of the potentiometer 3 rotates counterclockwise in accordance with the rotation of the shaft 17 and the accelerator pedal 4. Since the body of the potentiometer 3 is fixed to the lever 12, the body of the potentiometer 3 rotates counterclockwise in accordance with the rotation of the lever 12. Provided that the arm 4a contacts the rubber member 16a of the stopper 16, the control arm of the potentiometer 3 and the body of the potentiometer 3 move together with the lever 12 since the shaft 17 rotates counterclockwise in accordance with the rotation of the lever 12. Thus, during the angular movement of the accelerator pedal 4 by the quantity "L" (see FIG. 3), the angular position of the control arm of the potentiometer 3 remains unchanged relative to the body of the potentiometer 3 so that the output signal from the potentiometer 3 continues to assume a given voltage corresponding to the undepressed position of the accelerator pedal 4 as shown in FIG. 4.

It is now assumed that the change valve 33 and the actuator 35 go wrong and thus the lever 12 keeps in contact with the stopper 14 regardless of turning off auto drive. In this wrong case, as shown by the broken line of FIG. 4, the output signal from the potentiometer 3 can vary linearly with the degree of depression of the accelerator pedal 4. In addition, when the accelerator pedal 4 is released, the accelerator pedal 4 returns to its undepressed position (the auto-drive undepressed position) and the output signal from the potentiometer 3 assumes a value corresponding to the undepressed position. Thus, even in such a wrong case, the output signal from the potentiometer 3 accurately represents the degree of depression of the accelerator pedal 4 so that the vehicle can be driven normally.

Figure 18:
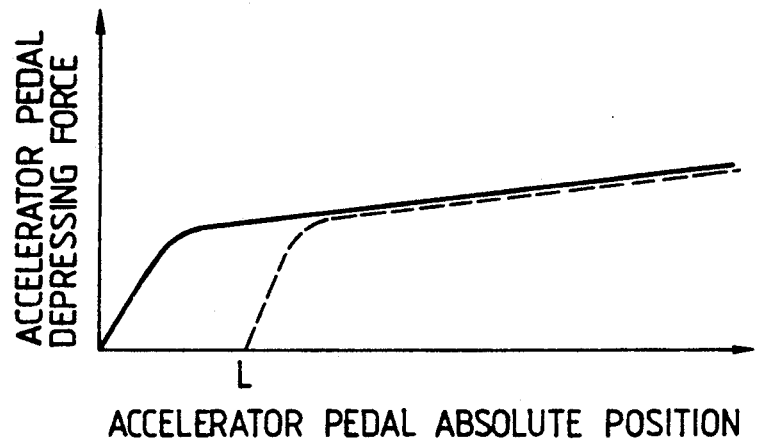
FIG. 18 is a diagram showing the relation between the absolute position of the accelerator pedal and the force of depressing the accelerator pedal in the auto drive system of FIG. 1.

FIG. 18 shows the relation between the force of depressing the accelerator pedal 4 and the absolute position of the accelerator pedal 4. In the case where auto drive is off, the absolute position of the accelerator pedal 4 moves from the normal undepressed position as the force of depressing the accelerator pedal 4 increases from zero. In the case where auto drive is on, the absolute position of the accelerator pedal 4 moves from the auto drive undepressed position as the force of depressing the accelerator pedal 4 increases from zero. The auto drive undepressed position is spaced from the normal undepressed position by the interval "L" toward the fully-depressed position of the accelerator pedal 4.

DESCRIPTION OF THE SECOND PREFERRED EMBODIMENT

Figure 12:
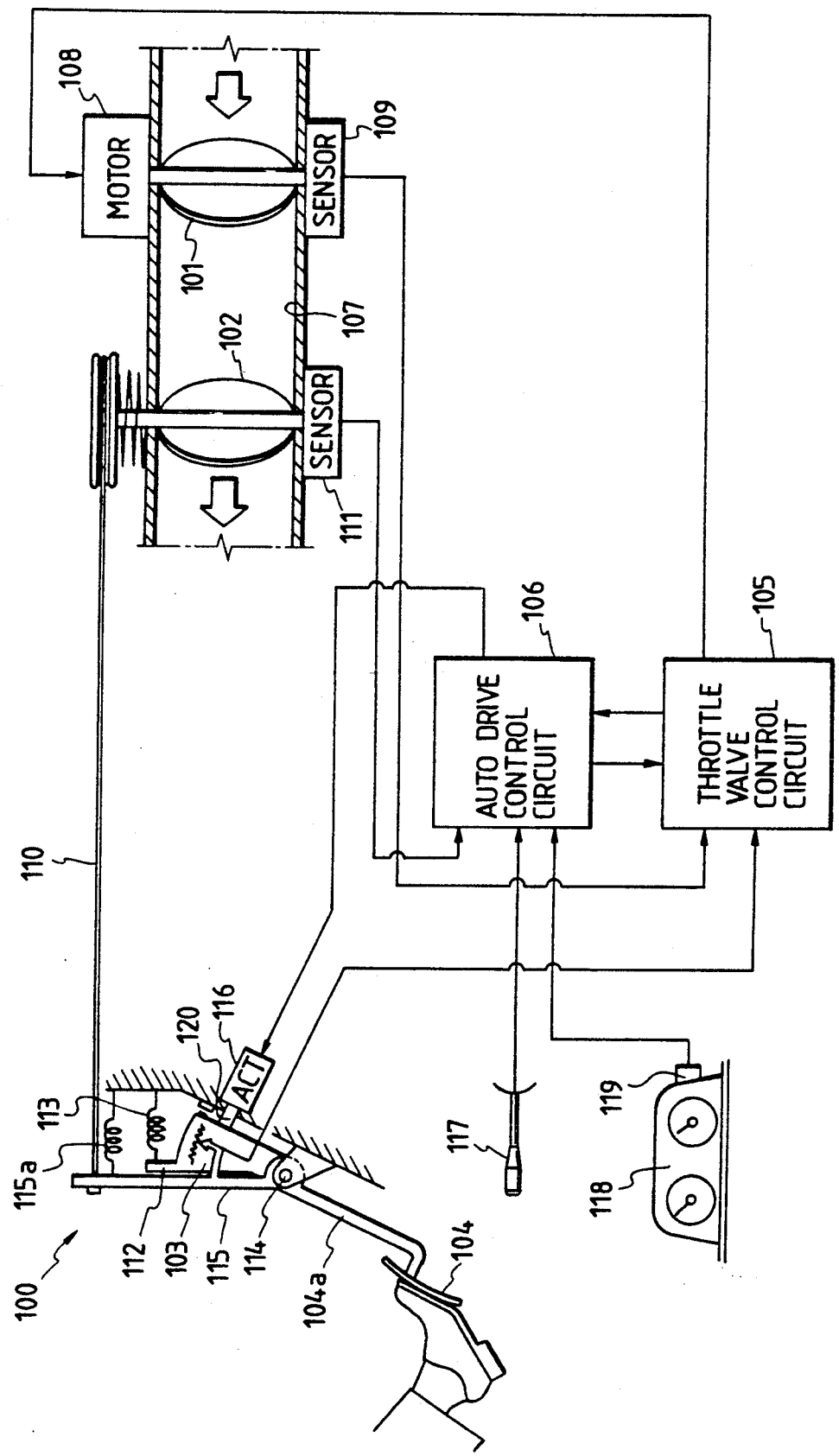
FIG. 12 is a diagram of an auto drive system for a vehicle according to a second embodiment of this invention.

With reference to FIG. 12, an auto drive system 100 for a vehicle includes a first throttle valve 101, a second throttle valve 102, a potentiometer (a position sensor) 103, an accelerator pedal 104, a throttle valve control circuit 105, and an auto drive control circuit 106. It should be noted that the accelerator pedal 104 may be replaced by an accelerator lever or another manually-operated member for varying the power output of a vehicle-powering engine. In addition, the potentiometer 103 may be replaced by a displacement sensor or an angular position sensor.

The first and second throttle valves 101 and 102 are rotatably disposed in an engine air intake passage 107. The first and second throttle valves 101 and 102 are arranged in tandem (series). The position of the first throttle valve 101 is upstream of the position of the second throttle valve 102. The rate of air flow, that is, the rate of air-fuel mixture flow, into a vehicle-powering engine depends on the degree of opening of the first throttle valve 101 and the degree of opening of the second throttle valve 102. As will be made clear later, the first throttle valve 101 is controlled in response to an output signal from the potentiometer 103 which represents the degree of depression of the accelerator pedal 104. The second throttle valve 102 is mechanically linked with the accelerator pedal 104.

The first throttle valve 101 can be driven by a stepping motor 108. The stepping motor 108 is controlled by a control signal fed from the throttle valve control circuit 105. The degree of opening of the first throttle valve 101 is varied by the stepping motor 108 in response to the control signal. An angular position sensor 109 associated with the first throttle valve 101 detects the actual degree of opening of the first throttle valve 101, and outputs an analog signal representative thereof. The throttle opening degree signal is fed from the angular position sensor 109 to the throttle valve control circuit 105.

The second throttle valve 102 is mechanically connected to the accelerator pedal 104 via members including an accelerator wire 110. As the accelerator pedal 104 is depressed, the accelerator wire 110 is pulled so that the second throttle valve 102 is opened. An angular position sensor 111 associated with the second throttle valve 102 detects the actual degree of opening of the second throttle valve 102, and outputs an analog signal representative thereof. The throttle opening degree signal is fed from the angular position sensor 111 to the auto drive control circuit 106.

The accelerator pedal 104 is pivotally mounted on a shaft 114 via a first arm 104a. A second arm 115 connected to the first arm 104a is pivotally mounted on the shaft 114. An end of the accelerator wire 110 is connected to a free end of the second arm 115. As the accelerator pedal 104 is depressed, the second arm 115 rotates about the shaft 114 against the force of a return spring 115a so that the accelerator wire 110 moves.

The potentiometer 103 has a control arm and a body. The control arm can move relative to the body. The output signal from the potentiometer 103 depends on the angular position of the control arm relative to the body. The control arm of the potentiometer 103 is connected to the second arm 115. The body of the potentiometer 103 is pivotally supported on the shaft 114. As will be made clear later, under normal conditions except special transitional conditions, the body of the potentiometer 103 is held at a given position. As the accelerator pedal 104 is released, the accelerator pedal 104 moves until the second arm 115 encounters a stopper 112 formed on the body of the potentiometer 103. Thus, the stopper 112 determines an undepressed position of the accelerator pedal 104. As the accelerator pedal 104 is moved, the second arm 115 rotates so that the control arm of the potentiometer 103 moves relative to the body of the potentiometer 103. The potentiometer 103 outputs an analog signal representing the degree of depression of the accelerator pedal 104 relative to the undepressed position of the accelerator pedal 104.

The throttle valve control circuit 105 receives the output signal from the potentiometer 103 which represents the degree of depression of the accelerator pedal 104. In addition, the throttle valve control circuit 105 receives the output signal from the angular position sensor 109 which represents the actual degree of opening of the first throttle valve 101. The throttle valve control circuit 105 drives and controls the stepping motor 108 in response to the accelerator depression degree signal and the throttle opening degree signal.

The throttle valve control circuit 105 and the auto drive control circuit 106 are connected so that they can communicate with each other. The auto drive control circuit 106 drives and controls an electrically-driven (solenoid) actuator 116 in response to information fed from the throttle valve control circuit 105. The auto drive control circuit 106 receives the output signal from the angular position sensor 111 which represents the actual degree of opening of the second throttle valve 102. In addition, the auto drive control circuit 106 receives various instruction signals from a combination switch unit 117 which includes an auto drive set switch, an auto drive cancel switch, and a deceleration switch. Furthermore, the auto drive control circuit 106 receives the output signal from a vehicle body speed sensor 119 which represents the speed of a vehicle body. The vehicle body speed sensor 119 is connected to a speedometer 118.

The actuator 116 has a movable output rod engaging the body of the potentiometer 103. As the actuator 116 is driven and controlled by the auto drive control circuit 106, the output rod of the actuator 116 rotates the body of the potentiometer 103 about the shaft 114 so that the undepressed position of the accelerator pedal 104 moves. Under conditions where the second arm 115 remains in contact with the stopper 112, as the body of the potentiometer 103 is moved by the actuator 116, the second arm 115 rotates and thus the accelerator wire 110 moves so that the second throttle valve 102 rotates.

Figure 13:
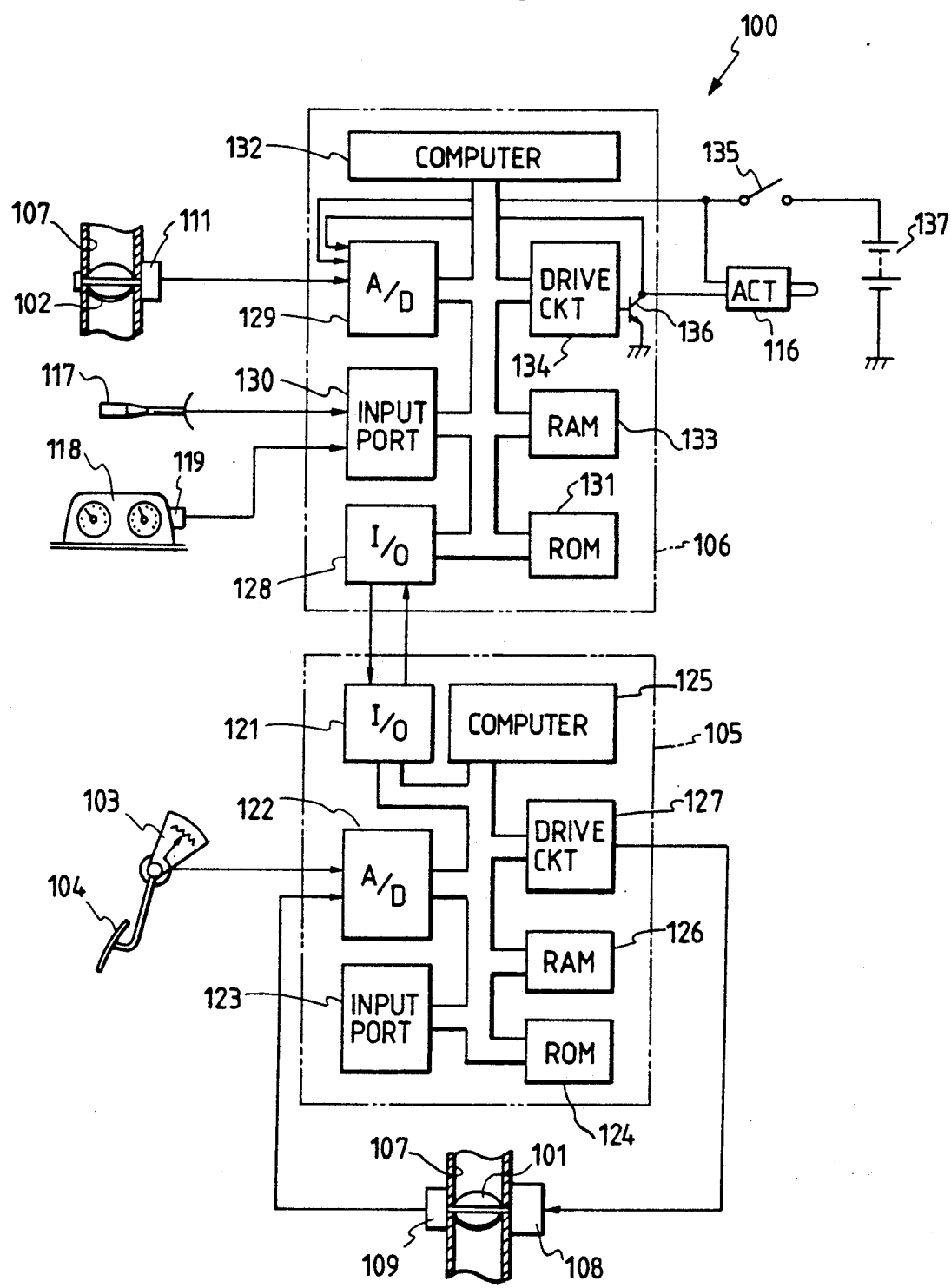
FIG. 13 is a diagram showing the details of the auto drive control circuit and the throttle valve control circuit in the auto drive system of FIG. 12.

As shown in FIG. 13, the throttle valve control circuit 105 includes a serial input/output (I/O) port 121, an A/D converter 122, and an input port 123. The I/O port 121 is connected to the auto drive control circuit 106. The I/O port 121 executes serial communication with the auto drive control circuit 106, transmitting and receiving information to and from the auto drive control circuit 106. The A/D converter 122 receives the analog accelerator depression degree signal from the potentiometer 103, converting the analog accelerator depression degree signal into a corresponding digital signal. In addition, the A/D converter 122 receives the analog throttle opening degree signal from the angular position sensor 109, converting the analog throttle opening degree signal into a corresponding digital signal. The input port 123 receives the output digital signals from vehicle wheel speed sensors (not shown) for skid control.

The throttle valve control circuit 105 also includes a read only memory (ROM) 124, a computer main section 125 such as a CPU, a random access memory (RAM) 126, and a drive circuit (an output port) 127. The I/O port 121, the A/D converter 122, the input port 123, the ROM 124, the computer main section 125, the RAM 126, and the drive circuit 127 are connected via a bus. The computer main section 125 operates to execute a program stored in the ROM 124. The RAM 126 is used in temporarily storing data during the operation of the throttle valve control circuit 105. The drive circuit 127 outputs a control drive signal to the stepping motor 108 to drive and control the latter.

The auto drive control circuit 106 includes a serial input/output (I/O) port 128, and A/D converter 129, and an input port 130. The I/O port 128 is connected to the I/O port 121 of the throttle valve control circuit 105. The I/O port 128 executes serial communication with the throttle valve control circuit 105, transmitting and receiving information to and from the throttle valve control circuit 105. The A/D converter 129 receives the analog throttle opening degree signal from the angular position sensor 111, converting the analog throttle opening degree signal into a corresponding digital signal. In addition, the A/D converter 129 receives an analog instruction signal from an auto drive main switch 135, converting the analog instruction signal into a corresponding digital signal. Furthermore, the A/D converter 129 receives a portion of an analog control drive signal fed to the actuator 116, converting the portion of the analog control drive signal into a corresponding digital signal. The input port 130 receives the digital instruction signals from the combination switch unit 117. In addition, the input port 130 receives the output digital signal from the vehicle body speed sensor 119.

The auto drive control circuit 106 also includes a read only memory (ROM) 131, a computer main section 132 such as a CPU, a random access memory (RAM) 133, and a drive circuit (an output port) 134. The I/O port 128, the A/D converter 129, the input port 130, the ROM 131, the computer main section 132, the RAM 133, and the drive circuit 134 are connected via a bus. The computer main section 132 operates to execute a program stored in the ROM 131. The RAM 133 is used in temporarily storing data during the operation of the auto drive control circuit 106. The drive circuit 127 outputs a control pulse signal of a variable duty cycle to the base of an NPN switching power transistor 136. The power transistor 136 is made periodically conductive and unconductive by the control pulse signal. The collector of the power transistor 136 is electrically connected to the positive terminal of a dc power source 137 via a control winding of the actuator 116 and the auto drive main switch 135. The emitter of the power transistor 126 is electrically connected to the negative terminal of the dc power source 137. Under conditions where the auto drive main switch 135 remains closed (remains in its on position), when the power transistor 136 is made periodically conductive and unconductive by the control pulse signal, the actuator 116 is periodically energized and de-energized in accordance with the control pulse signal. The position of the output rod of the actuator 116 depends on the duty cycle of the control pulse signal fed to the power transistor 136 from the drive circuit 134. The drive circuit 134 adjusts the duty cycle of the control pulse signal to control the position of the output rod of the actuator 116, that is, the undepressed position of the accelerator pedal 104. Under conditions where the auto drive main switch 135 remains open (remains in its off position), the actuator 116 continues to be de-energized.

Figure 14:
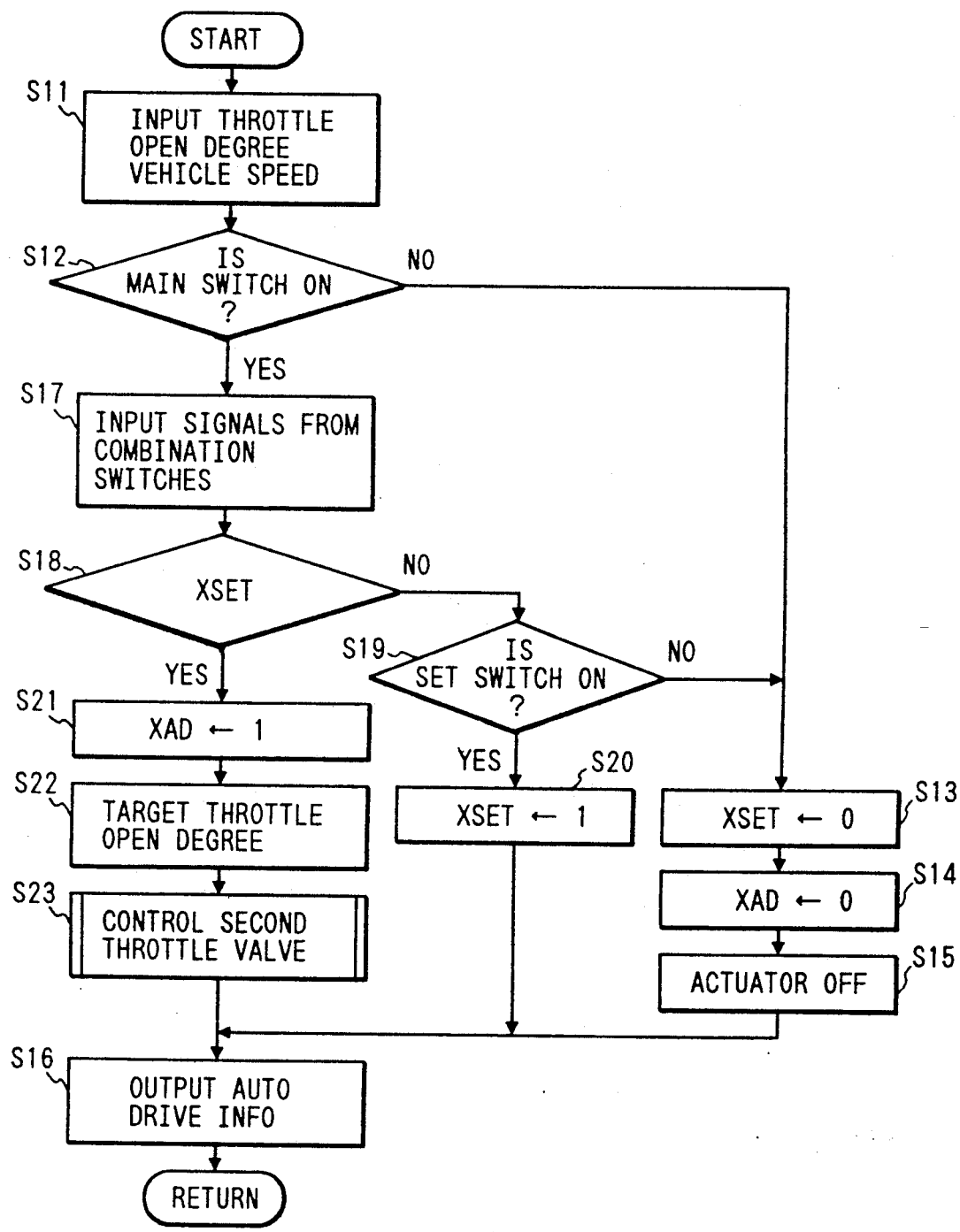
FIG. 14 is a flowchart of a program operating the auto drive control circuit in the auto drive system of FIG. 12.

The auto drive control circuit 106 operates in accordance with a program stored in the ROM 131. FIG. 14 is a flowchart of an auto drive control routine of the program which is executed periodically. As shown in FIG. 14, a first step S11 of the auto drive control routine samples and inputs the current values of the throttle opening degree signal and the vehicle body speed signal outputted from the angular position sensor 111 and the vehicle body speed sensor 119. A step S12 following the step S11 checks the current state of the output signal from the auto drive main switch 135, and determines whether or not the auto drive main switch 135 is currently in its on state. When the auto drive main switch 135 is determined to be not in its on position, the program advances from the step S12 to a step S13. When the auto drive main switch 135 is determined to be in its on position, the program advances from the step S12 to a step S17. The step S13 resets a flag XSET to "0". A step S14 following the step S13 resets a flag XAD to "0". A step S15 following the step S14 makes the power transistor 136 continuously unconductive so that the actuator 116 will remain de-energized. After the step S15, the program advances to a step S16. The step S16 outputs auto-drive-related information to the throttle valve control circuit 105. The auto-drive-related information includes the states of the flags XSET and XAD. After the step S16, the current execution cycle of the auto drive control routine ends and the program returns to a main routine.

The step S17 samples and inputs the current states of the instruction signals outputted from the combination switch unit 117. A step S18 following the step S17 determines whether or not the flag XSET is "1". When the flag XSET is determined to be not "1", the program advances from the step S18 to a step S19. When the flag XSET is determined to be "1", the program advances from the step S18 to a step S21. The step S19 determines whether or not the auto drive set switch is in its on state. When the auto drive set switch is determined to be not in its on state, the program advances from the step S19 to the step S13. When the auto drive set switch is determined to be in its on state, the program advances from the step S19 to a step S20. The step S20 sets the flag XSET to "1". After the step S20, the program advances to the step S16.

The step S21 sets the flag XAD to "1". A step S22 following the step S21 receives a target degree of opening of the first throttle valve 101 from the throttle valve control circuit 105. A step S23 following the step S22 calculates or determines a target undepressed position of the accelerator pedal 104 which varies as a function of the target degree of opening of the first throttle valve 101. The determination of the target undepressed position of the accelerator pedal 104 is executed by, for example, referring to a predetermined table or map representing the relation between the target undepressed position of the accelerator pedal 104 and the target degree of opening of the first throttle valve 101. Then, the step S23 controls the actuator 116 so that the actual undepressed position of the accelerator pedal 104 will be equal to the target undepressed position of the accelerator pedal 104. Since the minimum degree of opening of the second throttle valve 102 is varied in accordance with the undepressed position of the accelerator pedal 104, the step S23 controls the minimum degree of opening of the second throttle valve 102 in response to the target degree of opening of the first throttle valve 101. After the step S23, the program advances to the step S16.

Figure 15:
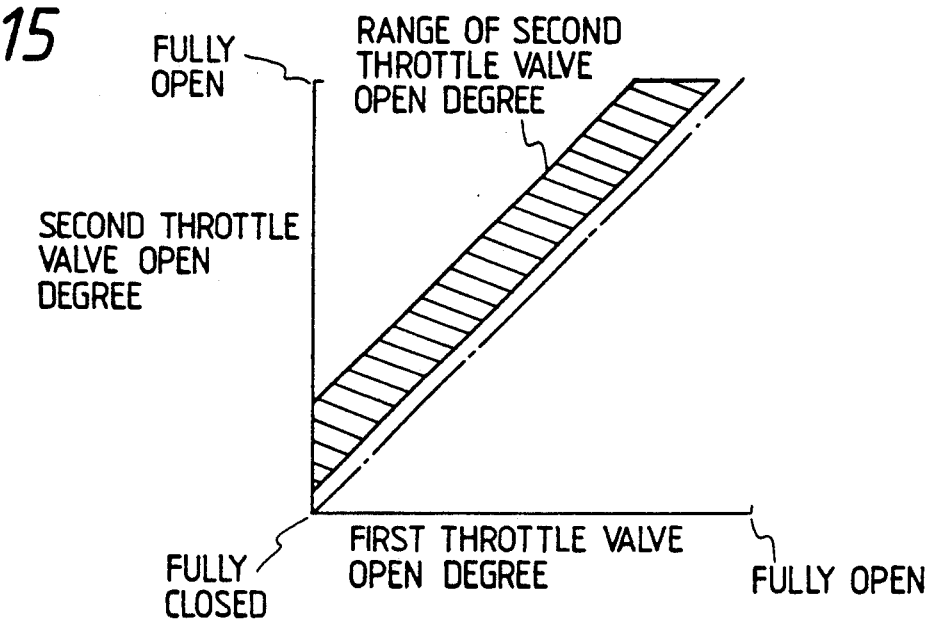
FIG. 15 is a diagram showing the relation between the degree of opening of the first throttle valve and the degree of opening of the second throttle valve in the auto drive system of FIG. 12.

FIG. 15 shows the relation between the degree of opening of the first throttle valve 101 and the degree of opening of the second throttle valve 102 which occurs during the execution of auto drive. Specifically, the degree of opening of the second throttle valve 102 is controlled and held in a hatched region of FIG. 15 which depends on the degree of opening of the first throttle valve 101. This control of the degree of opening of the second throttle valve 102 is executed by the step S23 of FIG. 14.

The lower edge of the hatched region of FIG. 15 corresponds to a minimum degree of opening of the second throttle valve 102 at which the second throttle valve 102 does not interfere with the air flow rate determined by the degree of opening of the first throttle valve 101. The upper edge of the hatched region of FIG. 15 is determined by the possible degree of depression of the accelerator pedal 104 to its fully-depressed position. Specifically, the degree of opening of the second throttle valve 102 depends on the absolute position of the accelerator pedal 104. If the second throttle valve 102 opens at a degree excessively greater than the degree of opening of the first throttle valve 101, the possible degree of depression of the accelerator pedal 104 tends to be insufficient. Thus, the upper edge of the hatched region of FIG. 15 is determined in view of the possible degree of depression of the accelerator pedal 104 and also the resolution of the positioning by the actuator 116.

Figure 16:
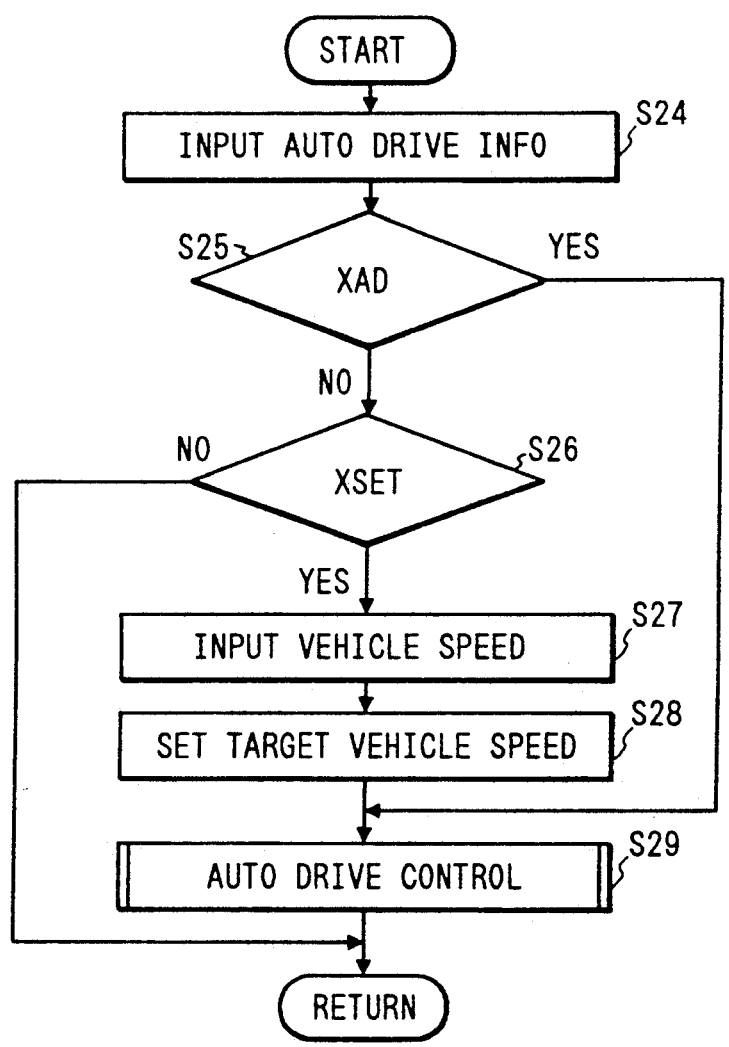
FIG. 16 is a flowchart of a program operating the throttle valve control circuit in the auto drive system of FIG. 12.

The throttle valve control circuit 105 operates in accordance with a program stored in the ROM 124. FIG. 16 is a flowchart of a throttle valve control routine of the program which is executed periodically. As shown in FIG. 16, a first step S24 of the throttle valve control routine receives the auto-drive-related information from the auto drive control circuit 106. A step S25 following the step S24 determines whether or not the flag XAD is "1". When the flag XAD is determined to be "1", the program advances from the step S25 to an auto drive control block S29. When the flag XAD is determined to be not "1", the program advances from the step S25 to a step S26. The step S26 determines whether or not the flag XSET is "1". When the flag XSET is determined to be "1", the program advances from the step S26 to a step S27. When the flag XSET is determined to be not "1", the current execution cycle of the throttle valve control routine ends and the program returns to a main routine.

The step S27 receives information from the auto drive control circuit 106 which represents the current vehicle body speed. In cases where the vehicle body speed sensor 119 is directly connected to the input port 123 of the throttle valve control circuit 105, the step S27 derives the current vehicle body speed by directly referring to the output signal of the vehicle body speed sensor 119. A step S28 following the step S27 sets an auto drive target vehicle body speed in accordance with the current vehicle body speed. After the step S28, the program advances to the auto drive control block S29.

The auto drive control block S29 sets an auto drive target degree of opening of the first throttle valve 101. After the auto drive control block S29, the current execution cycle of the throttle valve control routine ends and the program returns to the main routine.

In cases where the flags XAD and XSET are determined to be not "1" by the steps S25 and S26, a step (not shown) sets a target degree of opening of the first throttle valve 101 to a valve corresponding to a given position (for example, a fully-open position) of the first throttle valve 101.

Figure 17:
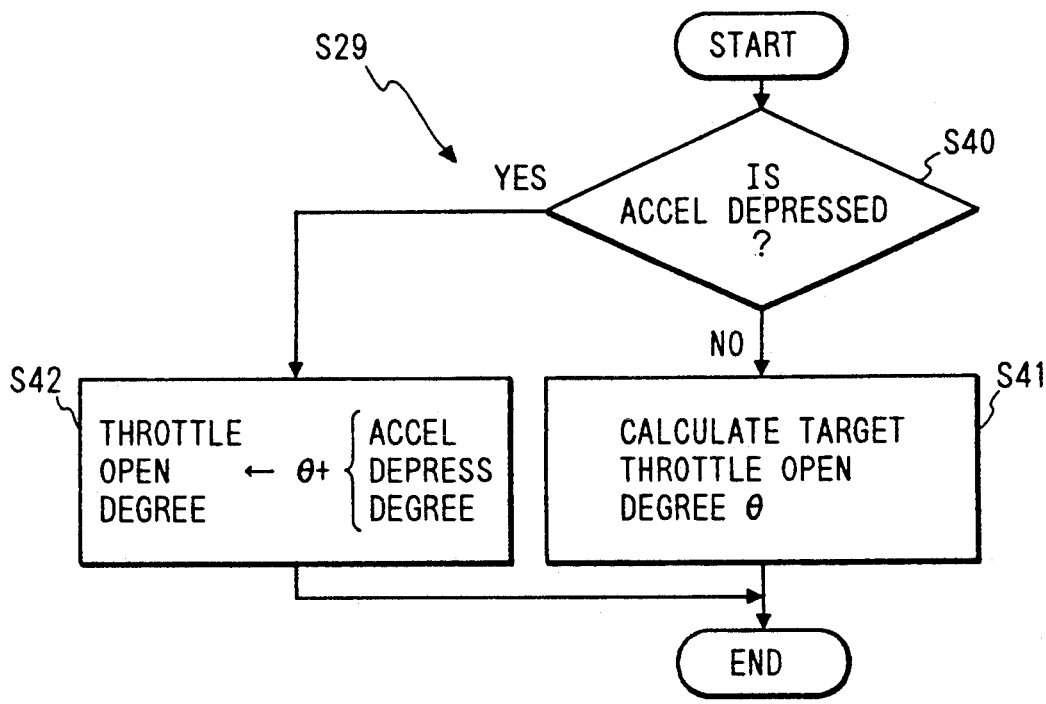
FIG. 17 is a flowchart of the auto drive control block in FIG. 16.

FIG. 17 shows the details of the auto drive control block S29. As shown in FIG. 17, a first step S40 of the auto drive control block S29 determines whether or not the accelerator pedal 104 is depressed by referring to the output signal from the potentiometer 103. When the accelerator pedal 104 is determined to be not depressed, the program advances from the step S40 to a step S41. When the accelerator pedal 104 is determined to be depressed, the program advances from the step S40 to a step S42. The step S41 calculates a target degree of opening of the first throttle valve 101 in a known way according to conventional auto drive control. After the step S41, the program moves out of the auto drive control block S29. The step S42 calculates a target degree of opening of the first throttle valve 101 from the previous target degree of opening of the first throttle valve 101 (which was calculated by the step S41) and the current degree of depression of the accelerator pedal 104. Specifically, the target degree of opening of the first throttle valve 101 which is calculated by the step S42 is equal to the sum of the previous target degree of opening of the first throttle valve 101 and the current degree of depression of the accelerator pedal 104. After the step S42, the program moves out of the auto drive control block S29.

It should be noted that a step or steps in a periodically-executed output routine (not shown) control the stepping motor 108 in response to the target degree of opening of the first throttle valve 101 which is set and calculated by the steps S41 and S42 and other steps. The control of the stepping motor 108 is designed so that the actual degree of opening of the first throttle valve 101 will be equal to the target degree of opening of the first throttle valve 101. The output routine includes a step for informing the auto drive control circuit 106 of the target degree of opening of the first throttle valve 101.

What is claimed is:

1. An auto drive system for a vehicle comprising:
   an accelerator member which can be operated by a vehicle driver;
   detecting means associated with the accelerator member for detecting a quantity of operation of the accelerator member;
   stopping means engagable with the accelerator member for stopping the accelerator member and determining an unoperated position of the accelerator member;
   driving means for moving a position of the detecting means and a position of the stopping means by a movement amount along directions corresponding to a direction of increasing the quantity of the operation of the accelerator member;

first controlling means for controlling a vehicle driving power on the basis of an output of the detecting means during unexecution of auto drive; and second controlling means for activating the driving means and controlling the vehicle driving power on the basis of a target vehicle speed during execution of auto drive, wherein activating the driving means maintains the position the accelerator member at a displacement associated with the vehicle driving power necessary to maintain the vehicle at the target speed.

2. The auto drive system of claim 1, wherein the detecting means comprises a potentiometer.

3. The auto drive system of claim 1, wherein the accelerator member comprises an accelerator pedal.

4. The auto drive system of claim 1, wherein the driving means comprises a pressure-responsive actuator.

5. The auto drive system of claim 1, wherein the driving means comprises an electrically-driven actuator.

6. The auto drive system of claim 1, wherein the movement amount provided by the driving means is equal to a constant value.

7. The auto drive system of claim 1, wherein the driving means comprises means for determining the movement amount by referring to a predetermined map.

8. An auto drive system for a vehicle, comprising:
a throttle valve for adjusting a vehicle driving power;
an accelerator pedal being mechanically separate from the throttle valve and being movable between an undepressed position and a fully-depressed position;
detecting means for detecting a displacement of the accelerator pedal from its undepressed position, and outputting an accelerator pedal position signal representative thereof;
determining means for determining whether auto drive is executed or unexecuted;
first controlling means for controlling the throttle valve in response to the accelerator pedal position signal when the determining means determines auto drive to be unexecuted;
second controlling means for controlling the throttle valve in accordance with a desired position of the throttle valve when the determining means determines auto drive to be executed; and
changing means for changing the undepressed position of the accelerator pedal in response to a result of said determining by the determining means.

9. An auto drive system for a vehicle, comprising:
a first throttle valve for adjusting a vehicle driving power;
a second throttle valve for adjusting the vehicle driving power;
an accelerator pedal movable between an undepressed position and a fully-depressed position;
connecting means for mechanically connecting the accelerator pedal and the second throttle valve so that the second throttle valve will be controlled by the accelerator pedal;
determining means for determining whether auto drive is executed or unexecuted;
first controlling means for controlling the first throttle valve in accordance with a desired position of the first throttle valve when the determining means determines auto drive to be executed; and
changing means for changing the undepressed position of the accelerator pedal in response to a result of said determining by the determining means.

* * * * *